June 12, 1934.  D. N. DAVIES  1,962,584

SHEET OF COATED METAL FOR EARTHED PANELS AND OTHER PURPOSES

Filed Jan. 4, 1930

INVENTOR.
Drury Norman Davies
BY
Jos. N. Nielsen
ATTORNEYS.

Patented June 12, 1934

1,962,584

UNITED STATES PATENT OFFICE 1,962,584

SHEET OF COATED METAL FOR EARTHED PANELS AND OTHER PURPOSES

Drury Norman Davies, London, England

Application January 4, 1930, Serial No. 418,654
In Great Britain January 8, 1929

4 Claims. (Cl. 175—21)

This invention is for improvements in or relating to earthed panels, and sheets or slabs of coated metal for this and like purposes.

According to the invention the manufacture of earthed panels consists in applying a synthetic resin composition to one or both sides of a metal screen (for example sheet metal perforated, deformed or superficially striated) in such a way as to ensure good union of the components of the panel as a whole and thereafter compressing the whole together and rendering the synthetic resin infusible by heat.

The invention includes the manufacture of earthed panels, wherein one or more perforated sheets of metal is or are disposed between sheets of fibrous material (for example paper, cloth, asbestos and the like) which have been impregnated with a synthetic resin and the whole compressed together and heated to convert the resin to an infusible form.

For the purpose of illustrating the invention, it will be described in connection with one of the many different embodiments thereof, references being made to the accompanying drawing, in which Fig. 1 is a perspective of an earthed panel made in accordance with the invention.

Figure 1:
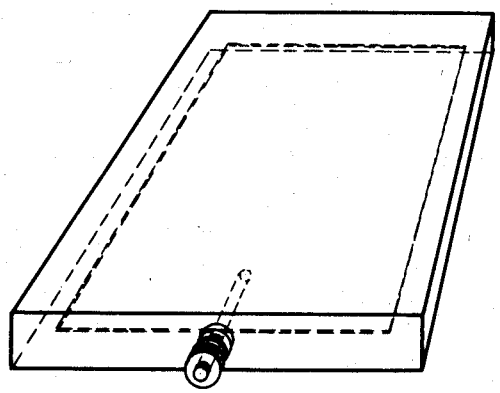
Figure 2:
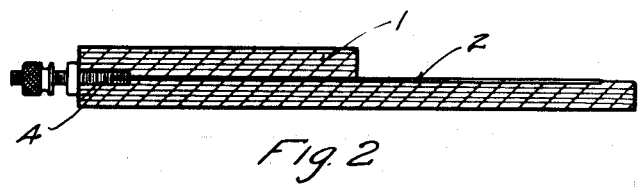
Fig. 2 is a longitudinal section on the line 2—2 of Fig. 3 through the panel with a portion cut away to show the perforated metal plate.
Figure 3:
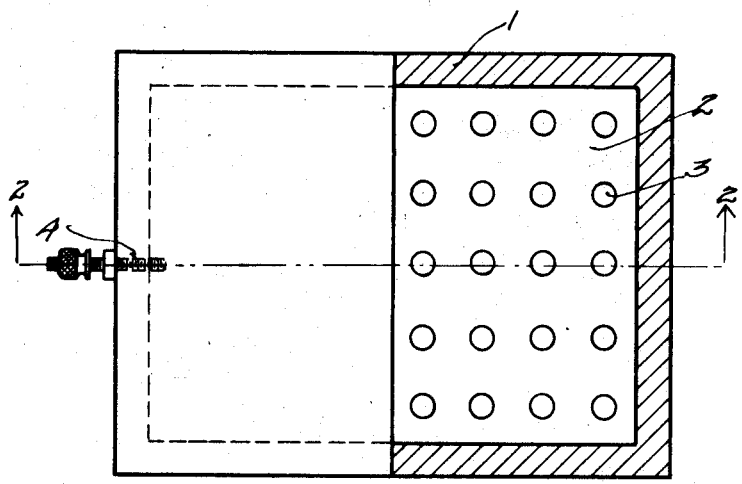
Fig. 3 is a plan view of the panel with a portion cut away as in Fig. 2.

In a preferred form the invention comprises the employment as fibrous material of cotton cloth impregnated with 60 per cent of a phenol-urea-aldehyde resin.

When the superimposed layers are consolidated under heat and pressure, the binder flows and runs into the perforations in the metal so that the whole becomes integrally united through the perforations.

The invention also includes the manufacture of plates or sheets containing mica, wherein a solution of a phenol-urea-aldehyde condensation product is applied to layers of mica, and a plurality of such layers are bonded together with the said condensation product as described in British Patent No. 302,612, characterized by the fact that in one or more of the layers a metal sheet or sheets is employed instead of the mica.

The following is an example of one way in which a panel may be made according to the invention.

Sheets of paper 1 impregnated with synthetic resin varnish and dried, such as are ordinarily employed in the manufacture of laminated synthetic resin sheets, may be superimposed and interleaved with one or more sheets of metal foil 2, such as aluminum, tin or copper, .005 of an inch thick, perforated with $\tfrac{1}{16}$ inch diameter holes 3 spaced at ½ inch square centres.

The mass is then consolidated and cured under heat and pressure to produce a compact sheet.

The invention is not restricted to the employment of metal sheets, but wire gauze or a screen consisting of a plurality of independent wires may be employed as the metal earthing medium.

One side of the sheet material as produced by the process of the invention may be polished and finished in imitation of wood grain, marble or similar finishes, such as commonly known in the art, and so provide a sheet for panelling, combining utility with an attractive appearance.

The metal conductor is completely insulated from the faces of the material and all risk of accidental short circuit, such as occurs with plain metal panels, is thereby eliminated.

Electrical contact with the included metal layer or layers 2 may be made by drilling and tapping part way through the sheet in a direction at right angles to its plane, or on its edge parallel to the direction of lamination, and inserting a small set screw 4. If tin or copper foil has been used, a small corner of the insulation may be cut or sawn away so as to expose sufficient of the metal for soldering.

Having now particularly described and ascertained the nature of my invention and in what manner the same is to be performed, I declare that what I claim is:—

1. A panel adapted to be earthed comprising a metal screen embedded between and having its edges covered and insulated by layers of cotton cloth, a synthetic resin binder securing the layers to the screen, and a connection having electrical contact with said screen and extending to the exterior of the panel.

2. A panel adapted to be earthed, comprising a metal screen embedded between layers of cotton cloth, a synthetic phenol-urea-formaldehyde resin binder securing the layers to the screen, the proportion of said binder being 60 per cent by weight of that of the cloth layer, and a connection having electrical contact with said screen and extending to the exterior of the panel.

3. A panel adapted to be earthed comprising a metal screen embedded between and having its edges covered and insulated by layers of cotton cloth, a heat and water-resistant synthetic resin binder impregnating said layers, forming the exposed surface thereof and extending through the openings in the screen to fuse the layers into a unitary mass at the openings, and a metallic connection extending from the exterior of the panel to have electrical contact with said screen.

4. A panel adapted to be earthed comprising a metal screen embedded between layers of cotton cloth, a synthetic urea-aldehyde resin binder securing the layers together and to the screen, and a connection having electrical contact with said screen and extending to the exterior of the panel.

DRURY NORMAN DAVIES.